United States Patent [19]

Goldhaber

[11] 4,018,111
[45] Apr. 19, 1977

[54] TAMPER RESISTANT FASTENER AND TOOL FOR OPERATING SAME

[76] Inventor: Marvin L. Goldhaber, 10005 Talbot, Huntington Woods, Mich. 48070

[22] Filed: Sept. 2, 1975

[21] Appl. No.: 609,385

[52] U.S. Cl. .................... 81/71; 85/45; 85/50 R
[51] Int. Cl.² ......................... B26D 5/30
[58] Field of Search ............ 81/71, 121 R; 85/45, 85/50; 145/50 A, 50 D, 52, 50 R

[56] References Cited

UNITED STATES PATENTS

| 256,045 | 4/1882 | Poulson | 85/50 R |
|---|---|---|---|
| 1,300,275 | 4/1919 | Johnson | 85/45 |
| 1,433,341 | 10/1922 | Cole | 145/52 |
| 2,576,742 | 11/1951 | Wolny | 145/52 |
| 2,817,377 | 12/1957 | Gate et al. | 145/52 |
| 3,924,507 | 12/1975 | Faroni | 85/50 R |

FOREIGN PATENTS OR APPLICATIONS 556,145  9/1943  United Kingdom ............ 85/45

*Primary Examiner*—James L. Jones, Jr.
*Attorney, Agent, or Firm*—Basile, Weintraub & Vanophem

[57] ABSTRACT

A tamper resistant fastener comprising a screw having a shank portion on which a left-handed threaded surface is disposed and a head portion of a circular contour, the upper surface of which is provided with a circular bore at a location which is eccentrically disposed with respect to the longitudinal axis of the shank portion of the screw. A retainer member having a step bore that is so sized as to receive the screw such that the head portion of the screw is below the outer edge of the smaller diametered portion of the step bore. The tool comprises a handle having a driving member, the end of which terminates in a circular configuration adapted to be inserted into the step bore of the retainer into an abutting engagement with the screw head such that a coupling key carried by the end of the driving member is received within the head bore of the screw such that rotation of the handle will cause rotation of the screw about the longitudinal axis of the screw shaft, while the end of the driving member is maintained in an abutting relationship with the head of the screw. Clamping arms are carried by the tool to insure the aforementioned engagement.

5 Claims, 8 Drawing Figures

U.S. Patent  April 19, 1977  4,018,111
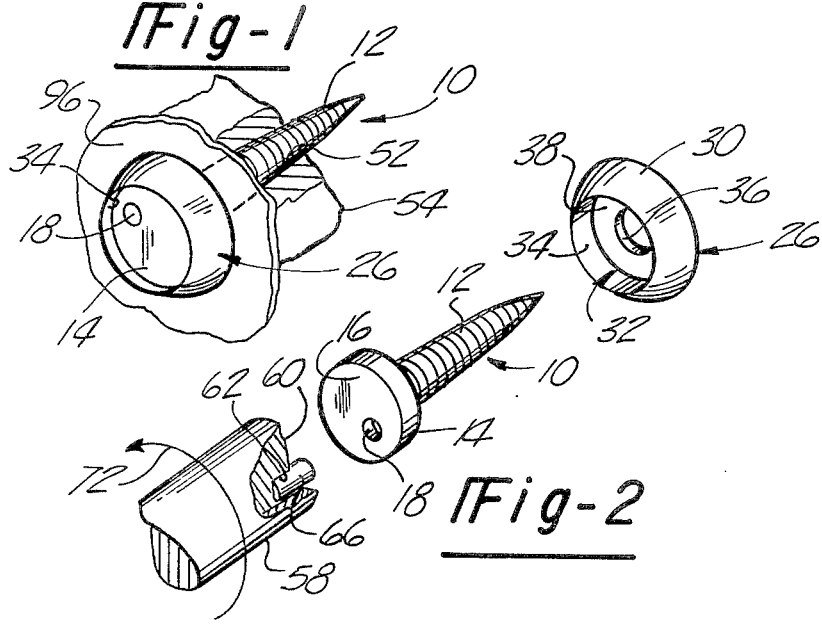
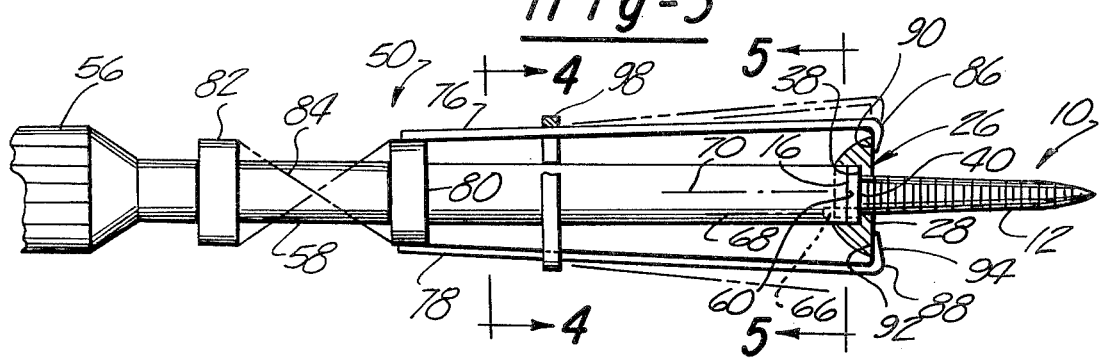
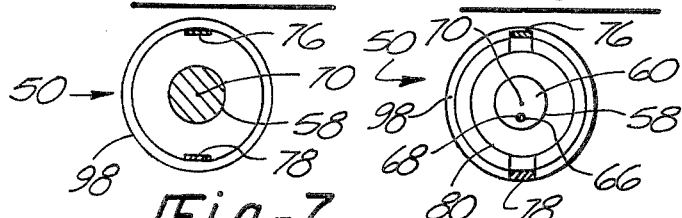 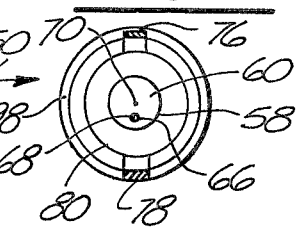 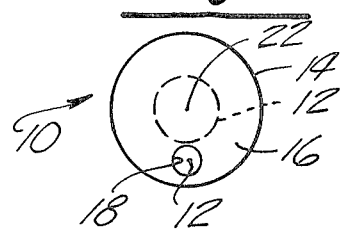

TAMPER RESISTANT FASTENER AND TOOL FOR OPERATING SAME

BACKGROUND OF THE INVENTION

1. Field of the Invention

The present invention relates to fasteners and tools for operating such fasteners and, in particular, the present invention relates to tamper resistant screws and a novel tool for applying and removing such screws.

2. Description of the Prior Art

Heretofore numerous fastening members and tools for operating such fastening members have been disclosed in the prior art. These fasteners are generally designed to resist operation except when a driver specifically designed for that purpose is utilized. Such screws having this special feature have countless applications where tampering or malicious removal should be guarded against. In the design of such fasteners the primary object is to make it extremely difficult for unauthorized persons to gain access to a particular piece of equipment or access to within a building or the like wherein such fasteners have been employed. The fastener and the tool utilized for operating the fastener must be of such a design that it is relatively easy for authorized persons to obtain access to the particular piece of equipment by the simple and easy removal of the screw.

Examples of prior art applications of tamper resistant fasteners are disclosed in U.S. Pat. Nos. 641,191; 1,895,984; 1,300,275; 3,174,383; 2,362,999; and Re. 22,681. While all of the aforementioned patents disclose various methods, apparatuses, and devices which are of a tamper-resistant nature; none of the patents disclose or suggest a tamper resistant fastener and tool for operating the same of the type which is disclosed and claimed hereinafter.

SUMMARY OF THE INVENTION

The present invention, which will be described subsequently in greater detail, comprises a screw having a threaded shank terminating in a circular end portion disposed in a complementarily shaped retainer and so sized as to receive in an abutting relationship the circular end of a driving member. The driving member is coupled to the screw head by means of a key disposed at a location which is eccentric with respect to the longitudinal axis of the screw shank, such that rotation of the tool driving member rotates the screw. Means carried by the tool clampingly engage the retainer to maintain the tool end and the screw head in a driving engagement.

It is therefore an object of the present invention to provide an inexpensive, easily manufactured tamper resistant fastener and a tool for operating the same.

It is another object of the present invention to provide a tamper resistant fastener and a tool for operating the same wherein it is extremely difficult for unauthorized persons to remove the fastener, while making it relatively easy and simple for authorized persons to remove and apply the fastener.

It is still another object of the present invention to provide a fastener which is highly tamper resistant unless a special tool is applied for the removal of the fastener.

It is a further object of the present invention to provide a tamper resistant fastener having a novel driving contact so formed and related to the object to be held by the fastener so that the fastener may only be removed by means of a special tool provided for that purpose and which fastener is peculiarly difficult to turn with any implement other than the special tool provided for that purpose.

It is yet another object of the present invention to provide a tamper resistant fastener and tool for operating the same which is extremely simple in construction and design and, thus, inexpensive to manufacture.

Other objects, advantages, and applications of the present invention become apparent to those skilled in the art of tamper resistant fasteners and tools for operating the same when the accompanying description of the best mode contemplated for practicing the invention is read in conjunction with the accompanying drawing.

BRIEF DESCRIPTION OF THE DRAWING

The description herein makes reference to the accompanying drawing wherein like reference numerals refer to like parts throughout the several views, and in which:

FIG. 1 is a perspective view of a tamper resistant fastener shown in an installed position;

FIG. 2 is a fragmentary exploded perspective view of the tamper resistant fastener illustrated in FIG. 1 and a portion of the tool for operating the fastener;

FIG. 3 is a fragmentary assembled view of the tamper resistant fastener and the tool for operating the fastener, the same being illustrated in an operative position;

FIG. 4 is a cross-sectional view of the tool taken along Line 4—4 of FIG. 3;

FIG. 5 is a cross-sectional view of the tool taken along Line 5—5 of FIG. 3;

FIG. 6 is an enlarged plan view of the head of the tamper resistant fastener illustrated in FIG. 2;

FIG. 7 is an enlarged plan view of a retainer member illustrated in FIGS. 1 and 2 of the drawing; and FIG. 8 is a cross-sectional view of the retainer member taken along Line 8—8 of FIG. 7.

DESCRIPTION OF THE PREFERRED EMBODIMENT

Referring now to the drawing and, in particular, FIGS. 1 and 2 wherein there is illustrated one example of the present invention in the form of a tamper resistant fastener, or screw, 10 comprising a shank portion 12 which has a left-handed threaded surface formed thereon. One end of the fastener 10 is enlarged to form a cylindrically-shaped head 14 which is radially larger than the shank portion 12. As can best be seen in FIGS. 2 and 6, the head 14 has a flat outer surface 16 into which is formed a circular bore 18. As can best be seen in FIG. 6, the circular bore 18 is disposed along a longitudinal axis 20 which is parallel to the shank longitudinal axis 22 such that the bore 18 is eccentric with respect to the shaft axis 22. While the screw shank portion 12 may be provided with a right-handed threaded surface, the left-handed threaded surface is preferred.

Referring further to FIGS. 7 and 8 there is illustrated a retainer member 26 which has a base 28 and a truncated, conically-shaped side wall 30 which terminates in a step bore 32. The step bore 32 is of a circular configuration having an enlarged diametered portion 34, the upper edge 42 of which terminates at the conically-shaped surface 30, while a smaller diametered bore 36 extends from the larger diametered bore 34 and terminates at the base 28. The two bores define a shoulder 38.

The step bore 32 is so sized that the shank portion 12 may readily pass through the smaller diametered bore 36 such that the bottom surface 40 of the cylindrically-shaped head 14 abuttingly engages the shoulder 38 of the retainer member 26, while the upper flat surface 16 of the cylindrically-shaped head 14 is located at a position inwardly spaced from the upper edge 42 of the larger diametered bore 34 and for a purpose which will be described hereinafter.

Referring now to FIGS. 2, 3, 4, and 5, the invention further comprises a tool 50 for operating the tamper resistant fastener 10; that is, the tool 50 functions to apply and remove the tamper resistant fastener 10 from a threaded engagement from a bore 52 of an object 54 which is desired to be secured in a tamper-proof manner to prevent the unauthorized removal of the fastener 10 and prevent entry into or removal of the object 54 from a desired location or position.

The tool 50 comprises a handle portion 56 which is illustrated as being integrally connected to a driving member 58; however, the handle 56 may be in the form of a drive socket to permit the turning of the tool 50 by means of a wrench or the like.

The driving member 58 is of a circular configuration having an end face 60 which is sized to be received within the larger diametered bore 34 of the retainer 26 and in abutment with the flat outer surface 16 of the fastener 10. An aperture 62 formed in the end face 60 of the driving member 58 accommodates a coupling key 66 which is sized to be received within the bore 18 formed within the head of the fastener 10. As can best be seen in FIGS. 3 and 5, the coupling key 66 is disposed along an axis 68 which is parallel to the longitudinal axis 70 of the driving member 58 and is spaced from the axis 70 the same distance as the bore 18 is spaced from the shaft axis 22 such that, when the end face 60 of the driving member 58 is in abutment with the flat outer surface 16 of the head of the fastener 10, the coupling key 66 is eccentric with respect to the shaft axis 22.

As can best be seen in FIG. 2, when the coupling key 66 is inserted within the bore 18, if the handle 56 is rotated in the direction indicated by the arrow 72, the handle 56 will rotate about the pin axis 68 and the driving member 58 will move off of the flat outer surface 16 unless held in position. The abutting contact between the end face 60 of the driving member 58 and the flat outer surface 16 of the fastening member 10 is accomplished by means of the retainer 26 which, as aforementioned, is so sized that the space above the flat surface 16 accommodates the end of the driving member 58 such that, when the driving member 58 is rotated about its axis 70, it is maintained concentric with the shaft axis 22; and the eccentric coupling of the driving member 58 with the fastener 10 results in the rotation of the fastener about the shaft axis 22. Thus, the threaded engagement of the fastener 10 within the object bore 52 is continued as long as the retainer 26 is maintained in the aforementioned position.

The retainer 26 is maintained in the aforementioned position with respect to the head 14 of the fastener 10 and the end of the driving member 58 by means of a clamping arrangement 74 which comprises a pair of longitudinally disposed clamping arms 76 and 78, each of which has an end attached to a movable collar 80 by any suitable means such as by welding. The movable collar 80 is slidably disposed along a portion of the driving member 58 and is urged away from the face 60 and toward a second fixed collar 82 by means of a spring 84 disposed between the fixed collar 82 and the movable collar 80. The opposite ends 86 and 88 respectively of the clamping arms 76 and 78 have right-angle bends which form support shoulders 90 and 92 adapted to be inserted under the retainer member 26 in abutting contact with the base 28. As can best be seen in FIG. 3, when a screw 10 is inserted through a retainer 26 in the manner shown and the face 60 of the driving member 58 is inserted into the enlarged diametered bore 34 into abutting contact with the flat outer surface 16 of the screw head 14, the engagement of the clamping arm ends 86 and 88 with the underside of the retainer 26 will maintain the driving member 58 in contact with the screw head 14. The action of the spring 84, urging the clamping arms 76 and 78 away from the end face 60 of the driving member 58, functions to insure that the end face 60 remains in abutting contact with the screw head 14. While the end 60 of the driving member 58 is in contact with the screw head and within the enlarged diametered portion 34 of the retainer 26, the coupling key 66 will function to transmit a rotational force to the screw 10 so that the same may be rotated and threaded into the desired bore 52. The engagement of the end of the driving member 58 with the side wall of the enlarged diametered bore 34 of the retainer 26 prevents the driving member from moving off the face 16 of the screw head 14; and, thus, rotational movement about the longitudinal axis 22 of the screw shank 12 may be obtained.

It should be noted that the outer surface of the clamping arm ends 86 and 88 are inwardly tapered at 94. It can be seen that, as the screw 10 is threaded into the bore 52 of the object 54 as the retainer base 28 comes in close proximity to the outer wall surface 96 of the object 54, the clamping arm ends 86 and 88 will be moved radially outward with respect to the screw by the compressive action of the retainer 26 and the wall surface 96. As the clamping arm ends 86 and 88 are forced outwardly under this compressive action, the retainer base 28 will abut the wall 96 and, thus, the aforementioned abutting engagement between the driving member 58 and the screw 10 will be maintained; that is, the end of the driving member 58 will be disposed within the large diametered bore 34 of the retainer 26 whereby the continued transmission of the rotational force from the tool 50 to the fastener 10 can be maintained.

To remove the fastener 10, it will be necessary to first engage the tool end of the driving member 58 into the enlarged diametered bore 34 of the retainer 26 and to commence rotating the fastener 10 so as to withdraw it from the bore 52 of the object 54. After the threaded fastener has been removed from the wall a distance approximately equal to the width of the retainer 26, the retainer will fall away from the driving member 58; and, thus, the continued rotation of the fastener can not be had until the clamping arms 76 and 78 are engaged with the retainer 26 to hold it in the aforementioned manner.

It can thus be seen that without the inventive tool 50 the removal of the fastener becomes extremely difficult. If removal of the fastener is attempted without the inventive tool 50, the retainer 26 will simply rotate relative to the screw head 14 as soon as the screw head 14 has been removed slightly from the bore 52. Additionally, the truncated conically-shaped surface on the retainer 26 inhibits the use of any gripping device to attempt rotation of the fastener.

As can best be seen in FIGS. 3 and 4, the tool clamping arrangement 74 further comprises an adjustment washer 98 which is of a ring shape and circumscribes the clamping arms 76 and 78. As the adjustment washer 98 is moved toward and away from the end face 60 of the driving member 58, the clamping arm ends 86 and 88 will be moved radially inwardly and outwardly; and, thus, the adjustment washer 98 provides a simple means for controlling the position of the ends of the clamping arms 76 and 78 to facilitate the simple and easy use of the tool 50.

It can thus be seen that the present invention has provided a new and improved tamper resistant fastener and a tool for operating the same, both of which are of a simple and unique construction; yet both are readily adaptable to rapid manufacturing techniques such that the cost of the tool and the fastener is inexpensive.

It can also be seen that the present invention has provided a tamper resistant fastener which will make it extremely difficult for unauthorized persons to remove the fastener; yet, with the use of the inventive tool, the fastener may be relatively easily removed by authorized persons.

It should also be understood by those skilled in the art of tamper resistant fasteners and tools for operating such fasteners that the various configurations as described herein may be modified; and, in particular, the shape and size of the coupling key 66 and its receiving bore 18 may be varied as well as their location on the head 14. Similarly, the shape and size of the retainer 26 may be varied to accommodate the use of the tamper resistant fasteners in varying applications.

It should also be understood by those skilled in the art of tamper resistant fasteners and tools for operating such fasteners that other forms of the present invention may be had, all coming within the spirit of the present invention and the scope of the appended claims.

What is claimed is as follows:

1. A tamper resistant fastener comprising:
    a screw having a threaded body with a driving end portion having a circular contour, said driving portion end having a bore located eccentrically with respect to the longitudinal axis of said screw;
    a retainer having a circular step bore receiving said screw such that said threaded body extends through the smaller diametered portion of said step bore while the driving end portion of said screw is disposed within the larger diametered portion of said step bore such that said driving end portion of said screw is below the outer edge of the larger diametered portion of said step bore; and
    a tool for drivingly engaging said screw, said tool comprising:
    a driving member having an end with a circular contour sized to be received within said large diametered portion of said step bore of said screw and abuttingly engaging the upper surface of said driving end portion;
    key means carried by said end of said driving member and received in said bore of said driving end portion; and
    means carried by said driving member for engaging said retainer to maintain said retainer at said driving end portion of said screw such that said driving end portion of said screw remains disposed below the outer edge of the large diametered portion of said screw step bore.

2. The tamper resistant fastener defined in claim 1 wherein said clamping means comprises:
    a movable collar carried by said driving member and having clamping arms extending longitudinally toward said driving member end, each of said clamping arms having bent end portions adapted to be inserted on the bottom side of said retainer; and
    spring means carried by said driving member urging said clamping arms' right-angled ends toward said driving member end, such that said driving member end remains seated within said large diametered bore in abutment with said driving end portion.

3. The tamper resistant fastener defined in claim 2 further comprising means disposed around said clamping arms for adjusting the distance between said right-angled bent ends.

4. The tamper resistant fastener defined in claim 1 wherein the threaded body of said screw has a left-handed threaded surface formed thereon.

5. The tamper resistant fastener defined in claim 3 wherein the bottom portion of each of said right-angled bent ends of said clamping arms is formed with a cam surface which urges said clamping arms outwardly from under said retainer as said screw is driven into a threaded engagement with an object desired to be fastened such that said retainer is maintained in contact with said driving end portion of said screw by the abutment of said retainer with said last-mentioned object.

* * * * *